US010502637B2

(12) United States Patent
Simunovic et al.

(10) Patent No.: US 10,502,637 B2
(45) Date of Patent: Dec. 10, 2019

(54) METHOD FOR DESIGN AND CONTROL OF PROPERTIES OF SIMULATED FOOD PARTICLES FOR PROCESS MONITORING AND VALIDATION OF ASEPTICALLY PROCESSED MULTIPHASE FOODS AND BIOMATERIALS

(71) Applicant: HBC Holding Company, LLC, Raleigh, NC (US)

(72) Inventors: Josip Simunovic, Raleigh, NC (US); Pablo Marcelo Coronel, Apex, NC (US)

(73) Assignee: HBC Holding Company, LLC, Raleigh, NC (US)

(*) Notice: Subject to any disclaimer, the term of this patent is extended or adjusted under 35 U.S.C. 154(b) by 0 days.

(21) Appl. No.: 16/447,538

(22) Filed: Jun. 20, 2019

(65) Prior Publication Data
US 2019/0316971 A1 Oct. 17, 2019

Related U.S. Application Data

(63) Continuation of application No. 14/957,236, filed on Dec. 2, 2015, now Pat. No. 10,359,319.

(60) Provisional application No. 62/086,683, filed on Dec. 2, 2014.

(51) Int. Cl.
G01K 3/04 (2006.01)
G01K 7/42 (2006.01)

(52) U.S. Cl.
CPC ......... *G01K 3/04* (2013.01); *G01K 2007/422* (2013.01)

(58) Field of Classification Search
None
See application file for complete search history.

(56) References Cited

U.S. PATENT DOCUMENTS

| 5,722,317 | A | 3/1998 | Ghiron et al. |
| 5,739,437 | A | 4/1998 | Sizer et al. |
| 5,932,813 | A | 8/1999 | Swartzel et al. |
| 8,337,920 | B2 | 12/2012 | Simunovic et al. |
| 9,925,144 | B2* | 3/2018 | Fabio ............ A61K 38/095 |
| 2005/0050761 | A1* | 3/2005 | Benali ............ F26B 3/088 34/583 |
| 2011/0045079 | A1* | 2/2011 | Edwards ......... A61K 9/1617 424/489 |
| 2011/0320060 | A1 | 12/2011 | Batmaz et al. |

OTHER PUBLICATIONS

International Search Report and Written Opinion for PCT/US2015/063434 dated Apr. 8, 2016, 10 pages.

* cited by examiner

Primary Examiner — Clayton E. LaBalle
Assistant Examiner — Dennis Hancock
(74) Attorney, Agent, or Firm — Myers Bigel, P.A.

(57) ABSTRACT

This disclosure is directed to simulated food particles. In one possible configuration and by non-limiting example, the disclosure includes a method for design and control of properties of simulated food particles for process monitoring and validation of aseptically processed multiphase foods and biomaterials.

6 Claims, 9 Drawing Sheets

BOTTOM PARTICLE ASSEMBLY COMPONENT
(POLYMER A)

REAL-TIME DETECTABLE IMPLANT
(RESIDENCE TIME MEASUREMENT/
TEMPERATURE LEVEL DETECTION):
MAGNETIC TAG OR MAGNETIC SWITCH

TOP PARTICLE ASSEMBLY COMPONENT
(POLYMER B)

POST-PROCESS DETECTABLE IMPLANT
(THERMO-SENSITIVE/CUMULATIVE THERMAL
LETHALITY IMPLANT): HERMETICALLY SEALED
SUSPENSION OF BACTERIAL SPORES
(GEOBACILLUS STEAROTHERMOPHILLUS)

BOTTOM PARTICLE ASSEMBLY COMPONENT
(POLYMER A)

TOP PARTICLE ASSEMBLY COMPONENT
(POLYMER B)

REAL-TIME DETECTABLE IMPLANT
(RESIDENCE TIME MEASUREMENT/
TEMPERATURE LEVEL DETECTION):
MAGNETIC TAG OR MAGNETIC SWITCH

POST-PROCESS DETECTABLE IMPLANT
(THERMO-SENSITIVE/CUMULATIVE THERMAL
LETHALITY IMPLANT): HERMETICALLY SEALED
SUSPENSION OF BACTERIAL SPORES
(GEOBACILLUS STEAROTHERMOPHILLUS)

FIG. 1

|   | 1 | 2 | 3 | 4 | 5 | 6 | 7 | 8 | 9 | 10 |
|---|---|---|---|---|---|---|---|---|---|---|
| A | 0.859 | 0.864 | 0.841 | 0.863 | 0.867 | 0.857 | 0.855 | 0.868 | 0.847 | 0.845 |
| B | 0.869 | 0.845 | 0.854 | 0.831 | 0.859 | 0.859 | 0.851 | 0.858 | 0.871 | 0.864 |
| C | 0.861 | 0.871 | 0.844 | 0.881 | 0.875 | 0.868 | 0.874 | 0.884 | 0.864 | 0.868 |
| D | 0.862 | 0.854 | 0.853 | 0.856 | 0.871 | 0.849 | 0.875 | 0.869 | 0.862 | 0.864 |
| E | 0.861 | 0.843 | 0.857 | 0.847 | 0.857 | 0.836 | 0.861 | 0.858 | 0.876 | 0.863 |
| F | 0.848 | 0.842 | 0.872 | 0.836 | 0.854 | 0.846 | 0.837 | 0.857 | 0.842 | 0.842 |
| G | 0.863 | 0.854 | 0.86 | 0.847 | 0.857 | 0.858 | 0.869 | 0.843 | 0.859 | 0.861 |
| H | 0.86 | 0.851 | 0.837 | 0.87 | 0.851 | 0.852 | 0.843 | 0.847 | 0.852 | 0.849 |
| I | 0.851 | 0.852 | 0.847 | 0.846 | 0.859 | 0.846 | 0.851 | 0.855 | 0.839 | 0.856 |
| J | 0.861 | 0.845 | 0.876 | 0.838 | 0.854 | 0.856 | 0.839 | 0.863 | 0.861 | 0.858 |

*FIG. 6*

|   | 1 | 2 | 3 | 4 | 5 | 6 | 7 | 8 | 9 | 10 |
|---|---|---|---|---|---|---|---|---|---|---|
| A | 0.937 | 0.944 | 0.954 | 0.952 | 0.962 | 0.972 | 0.982 | 0.973 | 0.952 | 0.958 |
| B | 0.963 | 0.944 | 0.979 | 0.96 | 0.958 | 0.939 | 0.964 | 0.955 | 0.985 | 0.957 |
| C | 0.956 | 0.963 | 0.973 | 0.95 | 0.964 | 0.947 | 0.985 | 0.957 | 0.946 | 0.975 |
| D | 0.961 | 0.965 | 0.951 | 0.958 | 0.991 | 0.968 | 0.962 | 0.974 | 0.98 | 0.962 |
| E | 0.971 | 0.981 | 0.99 | 0.949 | 0.955 | 0.953 | 0.971 | 0.979 | 0.959 | 0.959 |
| F | 1.002 | 0.952 | 0.943 | 0.983 | 1.06 | 0.962 | 0.957 | 0.942 | 0.939 | 0.957 |
| G | 0.985 | 0.956 | 0.943 | 0.976 | 0.964 | 0.955 | 0.948 | 0.958 | 0.964 | 0.94 |
| H | 0.977 | 0.969 | 0.951 | 0.955 | 0.965 | 0.947 | 0.956 | 0.953 | 0.967 | 0.955 |
| I | 0.972 | 0.959 | 0.948 | 0.955 | 0.97 | 0.994 | 0.938 | 0.955 | 0.948 | 0.971 |
| J | 0.967 | 0.959 | 0.937 | 0.957 | 0.942 | 0.96 | 0.945 | 0.954 | 0.934 | 0.986 |

*FIG. 7* ns of an example two-component carrier particle and
METHOD FOR DESIGN AND CONTROL OF PROPERTIES OF SIMULATED FOOD PARTICLES FOR PROCESS MONITORING AND VALIDATION OF ASEPTICALLY PROCESSED MULTIPHASE FOODS AND BIOMATERIALS

CROSS-REFERENCE TO RELATED APPLICATION

This application is a continuation of U.S. application Ser. No. 14/957,236, filed Dec. 2, 2015, which application claims priority to U.S. Application No. 62/086,683, titled METHOD FOR DESIGN AND CONTROL OF PROPERTIES OF SIMULATED FOOD PARTICLES FOR PROCESS MONITORING AND VALIDATION OF ASEPTICALLY PROCESSED MULTIPHASE FOODS AND BIOMATERIALS, the disclosure of which is hereby incorporated by reference in its entirety.

SUMMARY

In general terms this disclosure is directed to simulated food particles. In one possible configuration and by non-limiting example, the disclosure includes a method for design and control of properties of simulated food particles for process monitoring and validation of aseptically processed multiphase foods and biomaterials.

One aspect is a method for construction and use of implant-carrying simulated particles for validation of continuous flow thermal processes for foods and/or biomaterials comprising: i) establishing a size and shape of a carrier particle; ii) establishing a size/volume of an internal cavity needed to carry implants; iii) separating a particle design into at least two components different in size and weight; iv) identifying and using at least one polymer less dense than water at room temperature, and at least one polymer with a higher density than water at room temperature; v) fabricating each of the components from at least two different polymers; vi) assembling constituent elements of the particle design into a hermetically sealed assembly incorporating at least one detectable or recoverable implant; vii) using the assembled particles to generate a population of particles with a range of critical properties; viii) using the assembled population as a test set to determine limits of residence times and lethalities accumulated by the processed products; and ix) identifying a fastest flowing configuration of the population and using the design to generate a larger population of test particles to be used for process validation.

Another aspect is a test population/set of simulated particles incorporating at least two different polymers with varying flow and thermal properties within a range established by the used polymers.

A further aspect is a method of determination of critical simulated particle property values (density) comprising the selection of a multi-polymer particle construction configuration with a shortest (fastest) residence time.

Yet another aspect is a method of process validation by implementing the particle configuration design, determined by selection of a multi-polymer particle construction configuration with a shortest (fastest) residence time, as the implant carrier.

BRIEF DESCRIPTION OF THE DRAWINGS

FIG. 1 illustrates examples of composite particle components of an example two-component carrier particle and examples of associated implants.

FIG. 6 is a table showing individual weights and codes of simulated particles assembled using a selected combination of polymers which yielded the lowest residence times when tested under full flow conditions in a continuous flow sterilization system.

FIG. 7 is a table showing individual weights and codes of simulated particles assembled using a selected combination of polymers which yielded the second lowest residence time levels when tested under full flow conditions in a continuous flow sterilization system.

DETAILED DESCRIPTION

Figure 2:
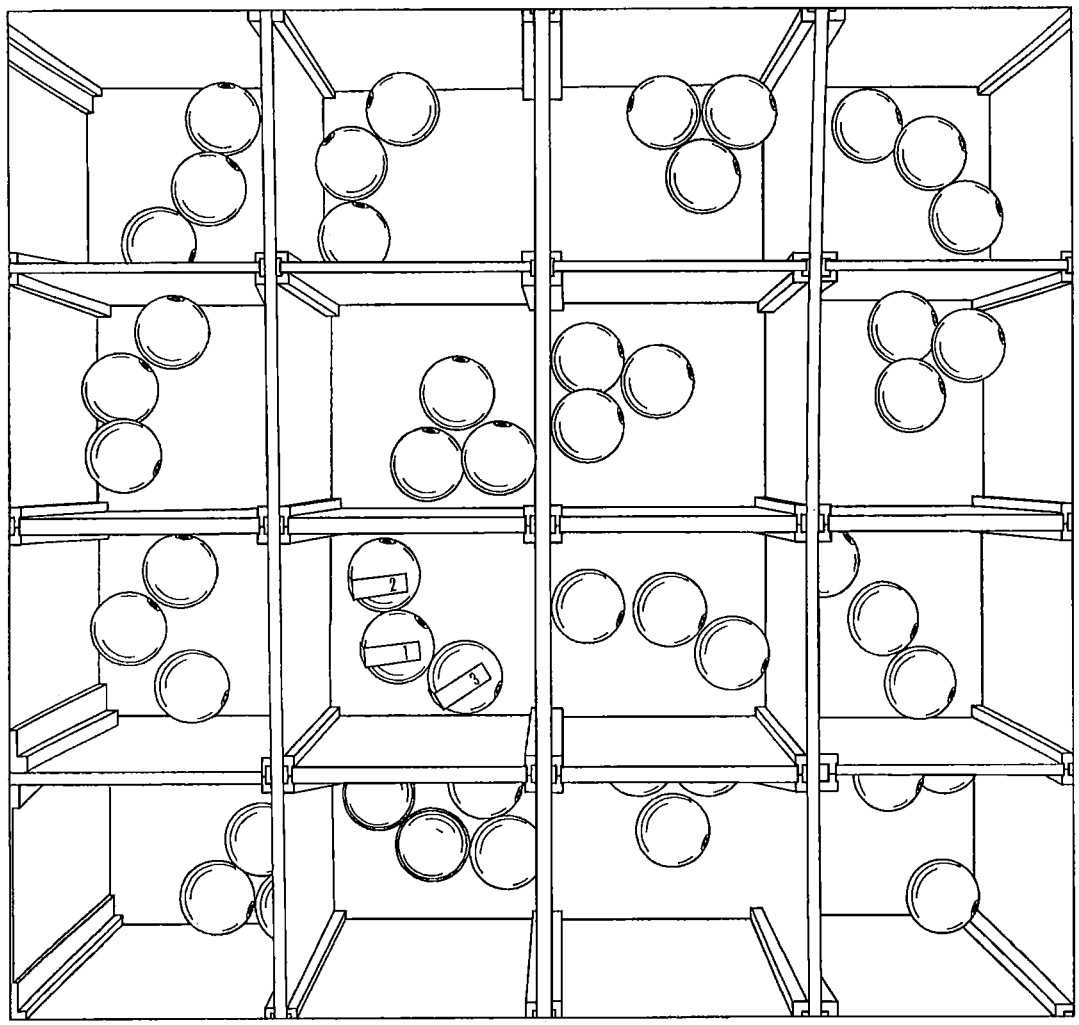
FIG. 2 illustrates an example of an assembled simulated spherical particle.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Simulated/fabricated food particles are used to design, establish and validate the pasteurization, sterilization processes performed under continuous flow conditions followed by aseptic packaging. They primarily serve as carriers and containers for detectable and/or quantifiable implants which serve to characterize the time-temperature history that the particles are subjected to during processing as well the cumulative lethality received in order to characterize and quantify the efficiency and safety of the implemented processes and achieved sterility levels.

These particles usually carry two types of implants—the first type is used to monitor the flow of the particles through the processing system and is typically magnetic. The second type is typically thermo-sensitive and is used to quantify the time-temperature history of the process (cumulative lethality) and can be physical (e.g. eutectic alloy or ferromagnetic shield based thermomagnetic switches), chemical (e.g. a known concentration of a solution or suspension of a chemical substance with known kinetics of thermal degradation and a straightforward means of post-process quantitative analysis), enzymatic (e.g. a hyper-thermophillic/extremophylic enzyme solution or suspension with a known initial concentration and kinetics of thermal degradation and a convenient method of analysis) and biological (e.g. thermo-resistant bacterial spores, typically non-toxic but more resistant surrogates for spores of proteolytic *Clostridium botulinum*, such as spores of *Geobacillus stearothermophillus*, *Clostridium sporogenes* or *Bacillus subtilis*.

It is important to make sure that these fabricated implant carrier particles have appropriate, i.e. conservative flow and thermal insulating properties. These properties need to be selected or adjusted to achieve the conservative design characteristics. For example, the thermo-sensitive implants carried by the fabricated particles need to be designed so that they get exposed to the minimal possible thermal treatment. In other words, each fabricated particles needs to flow at least as fast as the fastest food particle contained in the product and it also needs to provide at least the same level of thermal insulation/protection to implants carried within its cavity as the most insulating food particle provides to its geometric center. Therefore, if the fabricated particles have been designed correctly, achieving the appropriate sterility level (the cumulative lethality level) for the thermosensitive implants will guarantee that all other particulate product components and ingredients have been properly sterilized, therefore proving the safety of the delivered thermal process.

Flow characteristics of these particles are determined by their size, geometry, surface characteristics and density as well as carrier fluid characteristics, temperature levels experienced through the process and geometry of the flow-through continuous flow processing system.

Since a majority of these characteristics are either pre-determined, impossible to control or constant, effective particle density is the most significant controllable variable for these particles and can be used to control of flow properties of fabricated particles carried by the product carrier fluid while surrounded by real food particle loads.

Effective thermal insulation (protection) characteristics of fabricated particles are determined by material (polymer) density, heat capacity (specific heat), thermal conductivity and wall thickness of the material between the external surface and the surface surrounding the internal particle cavity.

One possible technique used to control the thermal insulation characteristics is the selection of the material of fabrication as well as addition or subtraction of the implemented material wall thickness.

Another method for control of flow and thermal properties according to the present disclosure involves the use of two or more different polymer materials to assemble the particles. Each of the used polymers has different thermo-physical characteristics like density, coefficient of thermal expansion, thermal conductivity, heat capacity etc. and by using different combinations of polymer materials, a range of these properties can be implemented for testing and enable the assembly of a population of particle which cover the entire range of flow and thermal properties expected to occur within the aseptic processing system for a certain processed product or product range.

In some embodiments the method according to the present disclosure makes it possible to generate this test population without the tedious and time-consuming adjustments and measurements when using different wall thicknesses of the material (which can also be very expensive, due to the high cost of fabrication of individual injection molds) for control of thermal insulation (implant protection) properties, and the associated method of ballast implanting for control of effective density of fabricated and assembled particles which can be done by implanting miniature glass beads into the hollow carrier cavity before assembly. This ballast loading can be used to control the effective density of assembled particles and thereby control their flow properties, i.e. residence times within the processing system.

Some embodiments of a method according to the present disclosure include one or more of the following advantages:

I. The ability to maintain the internal carrier cavity of the particles assembled using different polymers in identical size and shape. This enables the use of identical flow monitoring and thermo-sensitive implants into the cavity for the whole range of generated particle properties. This enables the testing, monitoring and objective comparisons of residence times and accumulated thermal lethality rates (microbial spore inactivation rates) better than when the internal cavity of the assembled particles varies due to the varying wall thicknesses surrounding the cavity (the external geometry and dimensions of the simulated particles need to remain identical for a specific population simulating a specific ingredient) and weight/ballast loads within the cavity.

II. The ability to quickly and simply assemble large test populations of particles with a wide range of recording and/or real time or post-process detectable and identifiable implants and tags with a wide range of flow and thermal properties as well as large populations of narrowly focused property ranges—the first population can be used in testing and establishment of critical carrier properties (fastest flowing, slowest heating) required for subsequent testing and validation while the narrowly focused property population can be used for actual residence time and thermal sterilization and validation, preferably utilizing both types of implants discussed previously within each particle's cavity.

In some embodiments simulated particles are assembled and tested using combinations of several different polymers. Since the simulated particles are asymmetric and made out of 2 or 3 components—the bottom and the lid are different in the case of a 2 component particle and bottom, lid and interconnecting tube segment can be made from different polymers in the case of a 3 component particle, therefore some embodiments enable the construction of the following number of different configurations (different flow and heat penetration properties) of simulated particles, as shown in Table 1.

TABLE 1

| Number of different polymers used for construction | Number of different configurations for a 2-component particle assembly | Number of different configurations for a 3-component particle assembly |
|---|---|---|
| 2 | 4 | 8 |
| 3 | 9 | 27 |
| 4 | 16 | 64 |
| 5 | 25 | 125 |

FIG. 1 depicts examples of composite particle components of a two-component carrier particle and associated implants. This illustration is intended to provide just one of the numerous possible embodiments, i.e. any particle assembly with asymmetrical (different or two different sizes designed to assemble into a spherical, cubic, parallelepiped, cylindrical, ovoid, bean-shaped etc.) top and bottom parts can also be used in other embodiments. For example, the top and bottom parts can be assembled to provide the set of key properties based on one or the other used polymer as well as two additional intermediate configurations where one is closer to Polymer A when it is used to fabricate the bottom component and the other closer to Polymer B.

Using the outlined concept of particle assembly using combinations of different polymers for bottom and top components the following configurations have been assembled in 10 mm (Table 2) diameter and 0.75 inch diameter (Table 3) formats. The measured weights in grams of both formats with 16 different configurations and 3 replicates of each configuration are presented in Table 2 (10 mm diameter) and Table 3 (0.75 inch).

TABLE 2

Weights of 10 millimeter diameter composite spherical particles with different polymer combinations using 4 polymers (3 replicate particles for each polymer combination)

| WEIGHT GRAMS (DOT/Replicate A) | | | | |
|---|---|---|---|---|
| | TOP | | | |
| BOTTOM | TPX | PolyProp | PolySulfone | Ultem |
| TPX | 0.843 | 0.848 | 1.05 | 0.953 |
| PolyProp | 0.839 | 0.846 | 0.92 | 0.96 |
| PolySulfone | 0.96 | 1.064 | 1.14 | 1.168 |
| Ultem | 1.064 | 1.072 | 1.159 | 1.197 |

| WEIGHT GRAMS (CIRCLE/Replicate B) | | | | |
|---|---|---|---|---|
| | TOP | | | |
| BOTTOM | TPX | PolyProp | PolySulfone | Ultem |
| TPX | 0.827 | 0.841 | 0.938 | 0.957 |
| PolyProp | 0.843 | 0.831 | 0.96 | 0.956 |
| PolySulfone | 1.054 | 1.051 | 1.15 | 1.188 |
| Ultem | 1.065 | 1.074 | 1.195 | 1.182 |

| WEIGHT GRAMS (CROSS/Replicate C) | | | | |
|---|---|---|---|---|
| | TOP | | | |
| BOTTOM | TPX | PolyProp | PolySulfone | Ultem |
| TPX | 0.849 | 0.845 | 0.936 | 0.942 |
| PolyProp | 0.821 | 0.834 | 0.94 | 0.959 |
| PolySulfone | 1.062 | 1.054 | 1.152 | 1.152 |
| Ultem | 1.072 | 1.092 | 1.167 | 1.191 |

TABLE 3

Weights of 0.75 inch diameter composite spherical particles with different polymer combinations using 4 polymers (3 replicate particles for each polymer combination)

| WEIGHT GRAMS (DOT/Replicate A) | | | | |
|---|---|---|---|---|
| | TOP | | | |
| BOTTOM | TPX | PolyProp | PolySulfone | Ultem |
| TPX | 1.513 | 1.528 | 1.765 | 1.753 |
| PolyProp | 1.527 | 1.557 | 1.78 | 1.785 |
| PolySulfone | 1.985 | 2 | 2.215 | 2.218 |
| Ultem | 2.027 | 2.042 | 2.273 | 2.26 |

| WEIGHT GRAMS (CIRCLE/Replicate B) | | | | |
|---|---|---|---|---|
| | TOP | | | |
| BOTTOM | TPX | PolyProp | PolySulfone | Ultem |
| TPX | 1.512 | 1.571 | 1.734 | 1.764 |
| PolyProp | 1.547 | 1.557 | 1.754 | 1.761 |
| PolySulfone | 2.016 | 1.992 | 2.219 | 2.226 |
| Ultem | 2.068 | 2.056 | 2.27 | 2.283 |

| WEIGHT GRAMS (CROSS/Replicate C) | | | | |
|---|---|---|---|---|
| | TOP | | | |
| BOTTOM | TPX | PolyProp | PolySulfone | Ultem |
| TPX | 1.522 | 1.53 | 1.72 | 1.766 |
| PolyProp | 1.575 | 1.59 | 1.745 | 1.806 |
| PolySulfone | 1.984 | 2.03 | 2.202 | 2.232 |
| Ultem | 2.49 | 2.064 | 2.25 | 2.254 |

Figure 3:
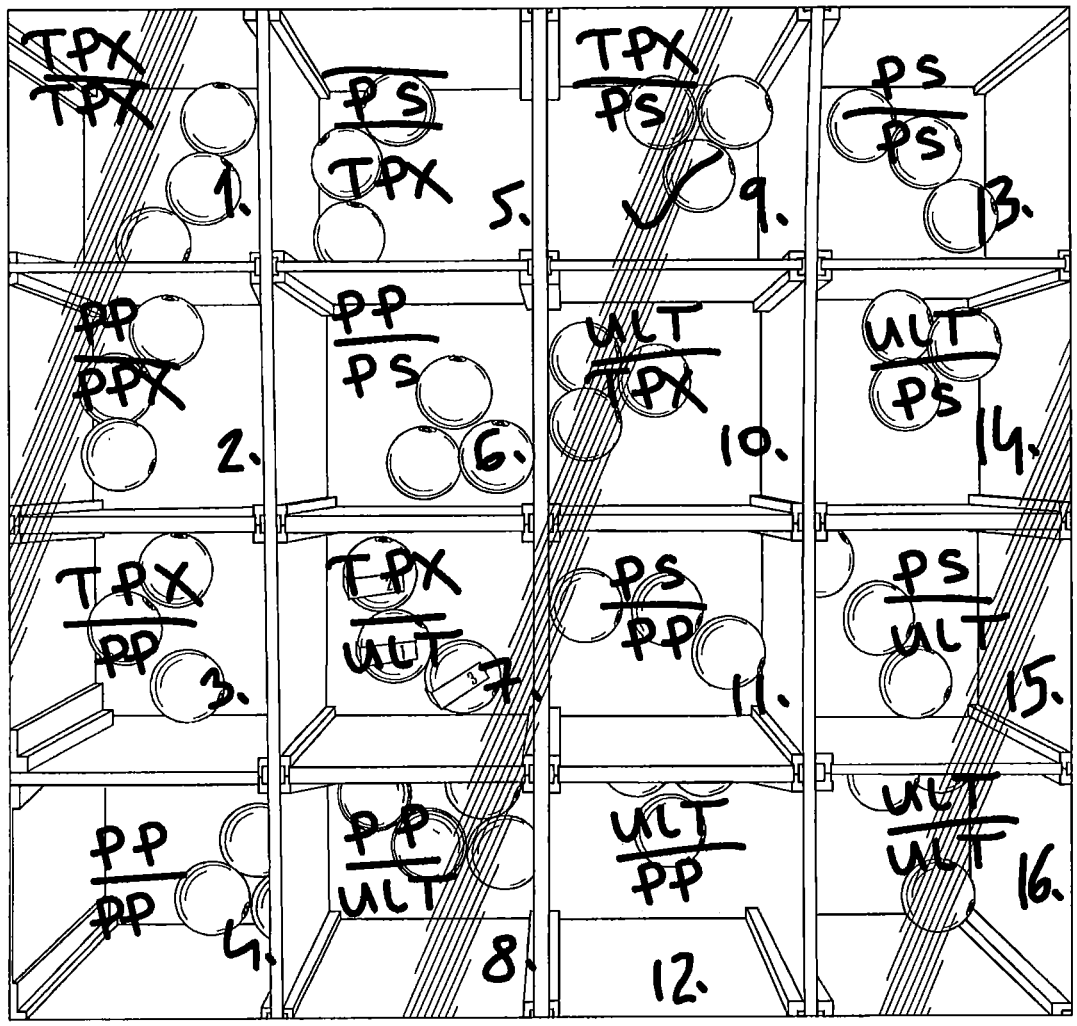
FIG. 3 illustrates another example of an assembled simulated spherical particle.

FIGS. 2 and 3 show examples of the assembled particle populations and the numeric codes for each of the 16 configurations in both formats.

FIG. 2 illustrates an example of fully assembled simulated spherical particle. In some embodiments the simulated spherical particle is a 10 mm simulated spherical particle (such as illustrated in FIG. 1), with four (Polypropylene/PP, Polymethylpentene/TPX, Poilysulfone/PS and Ultem/ULT) used polymers and weights specified in Table 2. Other embodiments include other sizes and configurations.

FIG. 3 illustrates an example of fully assembled simulated spherical particle. In some embodiments the simulated spherical particle is a 10 mm spherical simulated particle (such as illustrated in FIG. 1), with four (Polypropylene/PP, Polymethylpentene PTPX, Polysulfone/PS and Ultem/ULT) used polymers and weights specified in Table 2 and associated codes. Other embodiments have other sizes and configurations.

Figure 4:
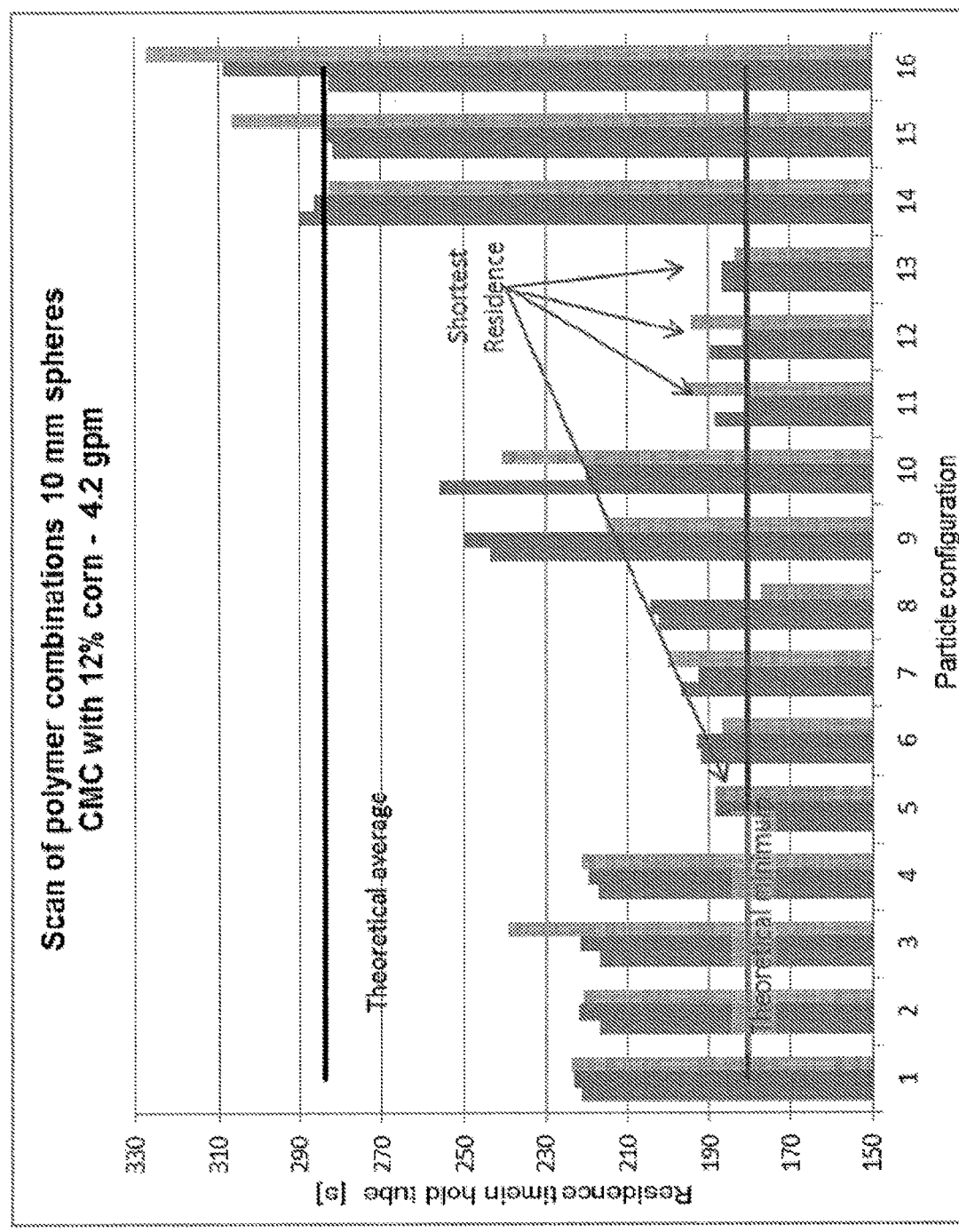
FIG. 4 is a graph providing a summary of measured residence times in a hold tube of a continuous flow sterilization installation for spherical simulated particles.

FIG. 4 is a graph providing a summary of measured residence times in the hold tube of a continuous flow sterilization installation for 10 mm spherical simulated particles illustrated in FIG. 1 with four (Polypropylene/PP, Polymethylpentene/TPX, Polysulfone/PS and Ultem/ULT) used polymers and weights specified in Table 2 and codes as shown in FIG. 3. The example shown in FIG. 4 involves an operating temperature range that is at ambient/room temperature, and the carrier material and product is CMS suspension in water with 12% corn particles.

Figure 5:
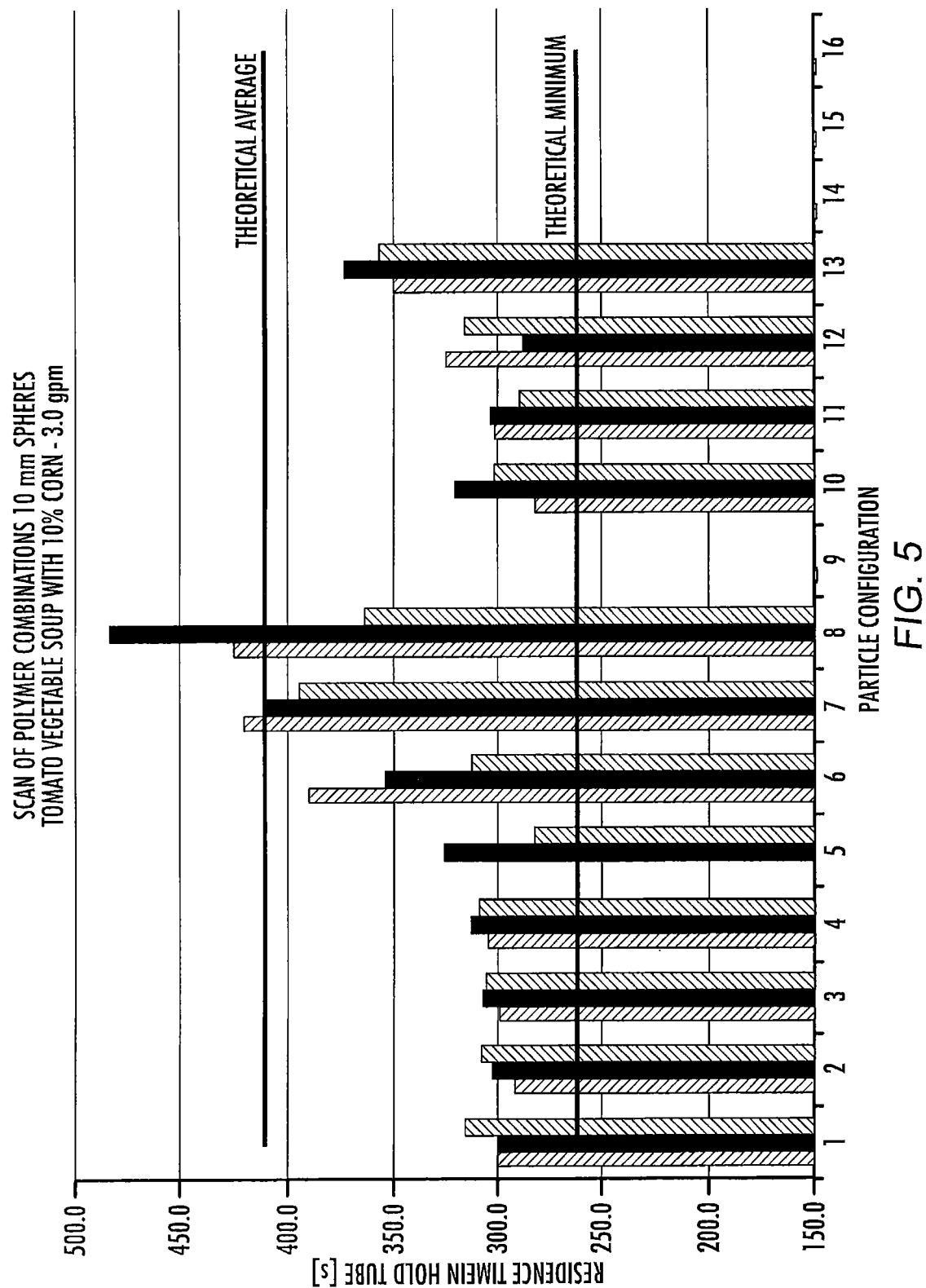
FIG. 5 is a graph providing another summary of measured residence times in the hold tube of a continuous flow sterilization installation for spherical simulated particles.

FIG. 5 is a graph providing a summary of measured residence times in the hold tube of a continuous flow sterilization installation for 10 mm spherical simulated particles illustrated in FIG. 1 with four (Polypropylene/PP, Polymethylpentene/TPX, Polysulfone/PS and Ultem/ULT) used polymers and weights specified in Table 2 and Codes as shown in FIG. 3. Configurations #9, #14, #15 and #16 have been omitted from the test population based on the previously measured long residence times (slow movement). In this example the operating temperature range is full thermal sterilization and the carrier material and product is tomato vegetable soup with 10% corn particles.

FIGS. 4 and 5 illustrate the importance of an appropriate density adjustment for carrier particles.

Specifically, as illustrated by the graphs some particle configurations could be up to 50% faster than others. This means that if slower particles are used as implant carriers for safety validation, the cumulative lethality received by the particulate phase could be very significantly overestimated, which could lead to an unsafe process validation and ultimately and unsafe product which could eventually pose a significant health hazard for the consuming public.

This is particularly important when considering the new possibilities of including the novel implants into the particle cavities, or even into real food particles like RFID tags and RFID technology based temperature recording and/or signaling devices.

These devices are to a large extent based on metallic components and therefore add a significant level of effective density to any carrier or real food or biomaterial particle—this would likely result in a significant particle flow slow down—and therefor extended residence times in both heating and holding segments of the sterilization installations.

Ultimately, this results in over-processing and a falsely high level of lethality received by such devices.

Therefore it is important to establish the particle configuration which provides the conservative (fast moving) flow/residence time characteristics to the implant-carrying assemblies.

FIGS. 4 and 5 also illustrate the importance and utility of at least some embodiments according to the present disclosure which provides a method and procedure for production of the test particle population with a range of critical properties as well as a method for comparisons of their residence times and received lethality levels in each process segment.

Subsequent to the residence time trials using the 16 multi-polymer configurations, two configurations resulting in the fastest particles (shortest residence times) have been replicated for 100 particles each with the resulting particle weights shown in FIGS. 6 and 7.

FIG. 6 is a table showing individual weights and codes of simulated particles assembled using a selected combination of two polymers which yielded the lowest residence times when tested under full flow conditions in a continuous flow sterilization system. FIG. 6 shows a configuration A and data in grams.

FIG. 7 is a table showing individual weights and codes of simulated particles assembled using a selected combination of two polymers which yielded the second lowest residence time levels when tested under full flow conditions in a continuous flow sterilization system. FIG. 7 shows a configuration B and data in grams.

Multiple particle replicates from the two selected configurations have been subsequently subjected to residence time testing under representative processing conditions (real product, full representative sterilization treatment using microwave heating and time of exposure, flow rate, temperatures and pressures).

Figure 8:
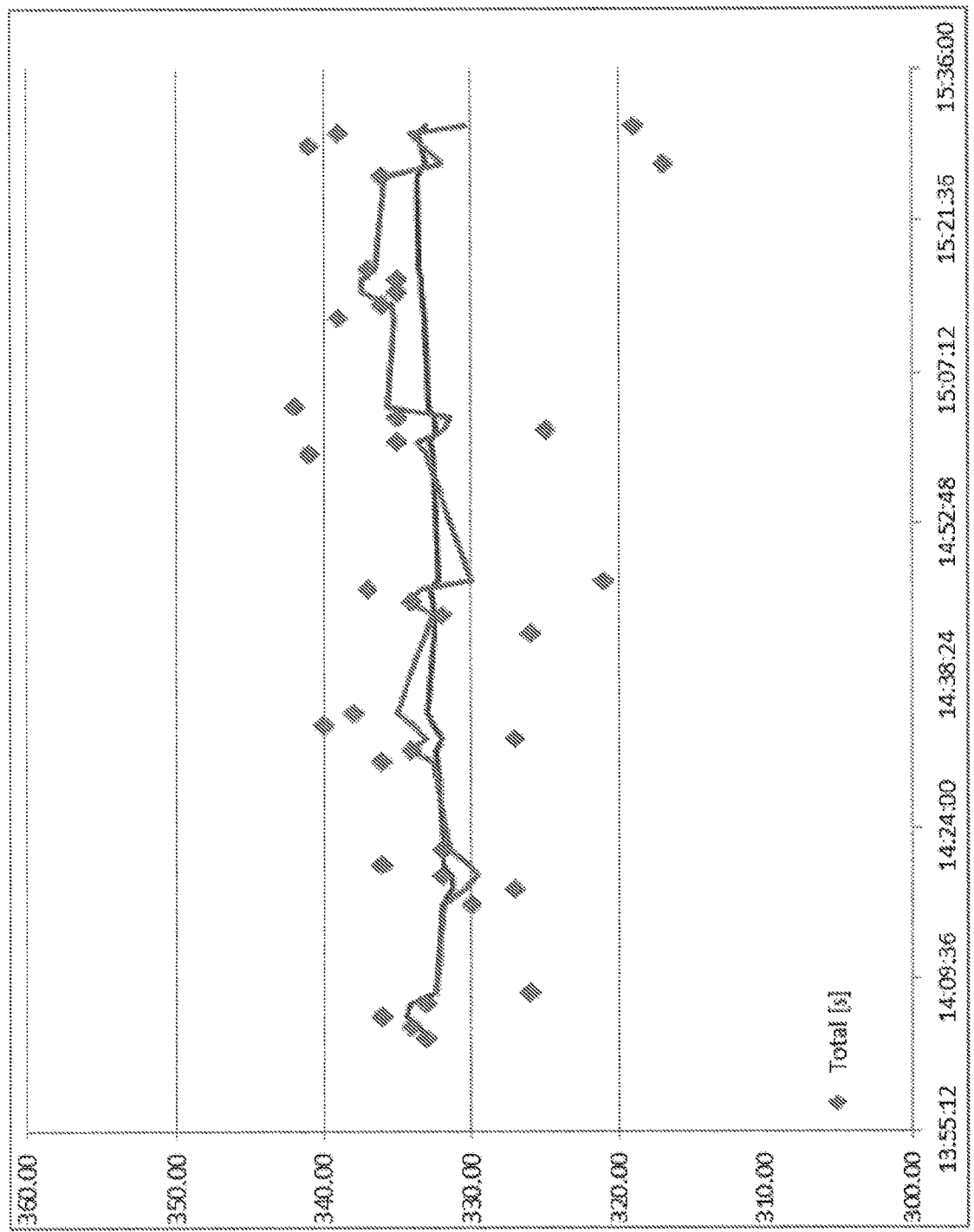
FIG. 8 is a graph illustrating an example of a cumulative residence time distribution.

FIG. 8 is a graph illustrating an example of a cumulative (whole hold tube) residence time distribution for configuration A.

Figure 9:
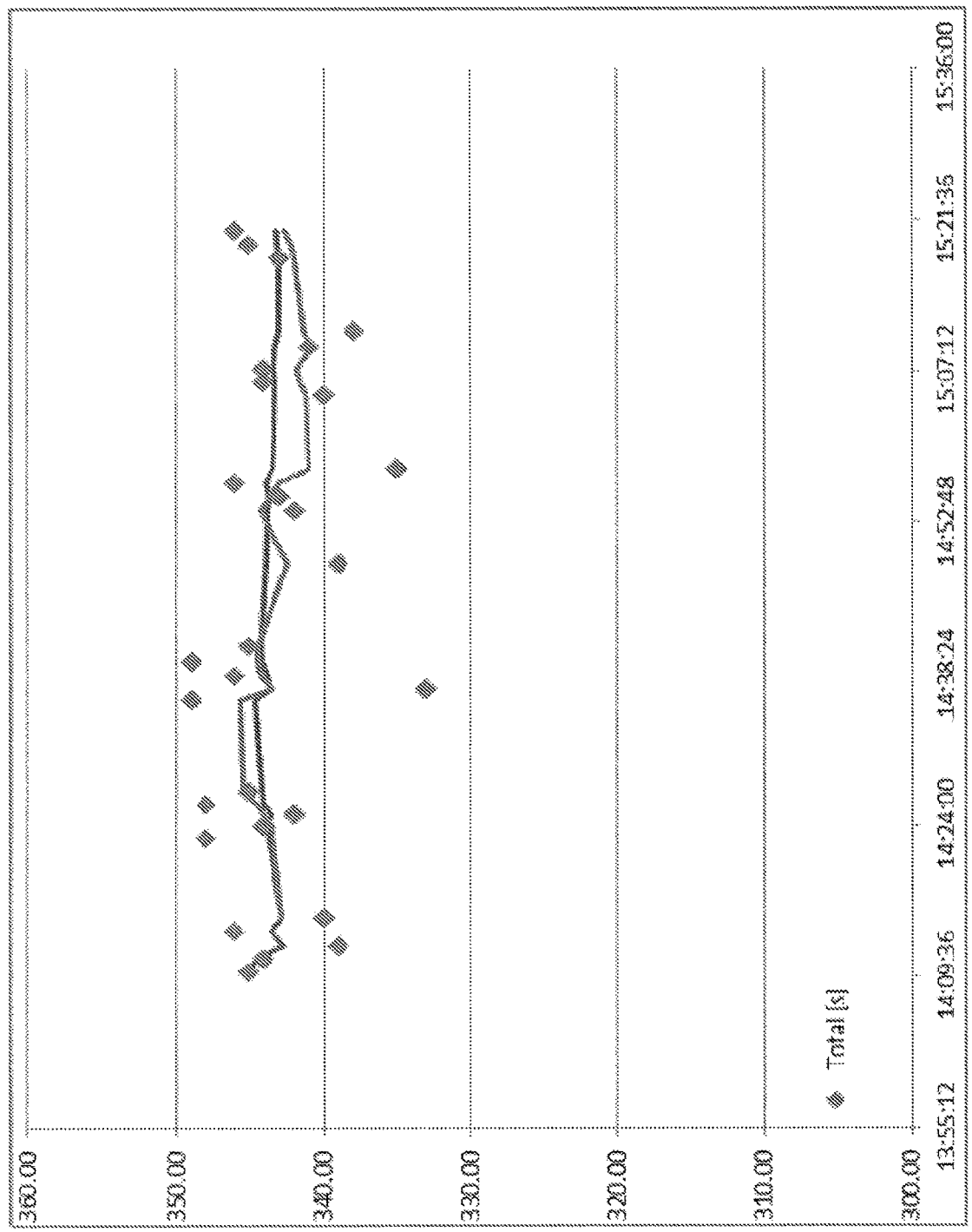
FIG. 9 is a graph illustrating an example of another cumulative residence time distribution.

FIG. 9 is a graph illustrating an example of a cumulative residence time distribution for configuration B.

FIGS. 8 and 9 illustrate that, in at least some embodiments, very narrow residence time distributions can be generated and achieved by selecting a proper particle configuration and maintaining a narrow range of effective particle densities.

Accordingly, and as discussed herein, some embodiments are or include aseptically processed and packaged particulate foods and biomaterials for residence time measurements and safety validation/biovalidation.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for validation of continuous flow thermal processes for foods comprising:
    creating a plurality of carrier particles each comprising first and second components, wherein at least some of the plurality of carrier particles comprise a first component comprising a first polymer and a second component comprising a second polymer;
    constructing a plurality of first simulated particles by, for each carrier particle, coupling the first and second components and receiving a first magnetic tag implant in an internal cavity defined by the first and second components;
    flowing the plurality of first simulated particles through a thermal processing system;
    measuring a residence time in the thermal processing system of each of the plurality of first simulated particles during the flowing step;
    creating and constructing a plurality of second simulated particles that have substantially the same physical properties as one or two of the plurality of first simulated particles that have the lowest measured residence time; and
    validating the thermal processing system by flowing the plurality of second simulated particles through the thermal processing system along with food comprising particles that are substantially the same size as each of the plurality of second simulated particles and measuring a residence time in the thermal processing system of each of the plurality of second simulated particles.

2. The method of claim 1 wherein the plurality of first simulated particles each have a different density.

3. The method of claim 1 wherein each of the plurality of first simulated particles has a shape of a cube or a sphere.

4. The method of claim 1 wherein the internal cavity of each of the plurality of first simulated particles has an identical size and shape.

5. The method of claim 4 further comprising receiving a thermo-sensitive implant in the internal cavity of each of the plurality of first simulated particles.

6. The method of claim 5 further comprising monitoring an accumulated thermal lethality rate in the thermal processing system of each of the plurality of first simulated particles during the flowing step.

* * * * *